United States Patent

Clark

[15] 3,678,200

[45] July 18, 1972

[54] FRAME SYNCHRONIZATION SYSTEM

[72] Inventor: James M. Clark, Cedar Grove, N.J.

[73] Assignee: International Telephone and Telegraph Corporation, Nutley, N.J.

[22] Filed: Aug. 24, 1970

[21] Appl. No.: 66,396

[52] U.S. Cl. ....................................178/69.5 R, 179/15 BS

[51] Int. Cl. ....................................................H04n 1/36

[58] Field of Search ........................178/69.5 R; 179/15 BS; 340/177; 307/269; 328/63

[56] References Cited

UNITED STATES PATENTS

| | | | |
|---|---|---|---|
| 3,069,504 | 12/1962 | Kaneko | 179/15 BS |
| 3,144,515 | 12/1964 | Kaneko | 179/15 BS |
| 3,594,502 | 3/1971 | Clark | 178/69.5 |
| 3,597,539 | 5/1971 | Clark | 178/69.5 |

*Primary Examiner*—Robert L. Richardson
*Assistant Examiner*—Richard P. Lange
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

A binary information signal having a given bit rate and a local binary synchronization reference signal are applied to a digital comparator, the output signal thereof indicating a match or a mismatch between the binary condition of successive adjacent bits of the information signal and the reference signal. A flip flop samples the output signal of the comparator. A decision circuit responds to the samples to produce a first signal having binary "O" when the decision level is exceeded and a binary "1" when the decision level is not exceeded and a second signal having a binary "1" condition when the system is in a search mode and a binary "O" condition when the system is in a sense mode. The comparator output signal is also coupled through a first OR to a first (N+1) bit shift register which is triggered by a burst of pulses at the bit rate. The previous inputs to the first shift register are stored therein and the output thereof is also coupled through the first OR. The comparator output signal is inverted to provide a complement of this output signal and is coupled through a second OR to a second (N+1) bit shift register which is also triggered by a burst of pulses at the bit rate. The previous inputs to the second shift register are stored therein and the output thereof is also coupled through the second OR. An AND is coupled to the output of the first stage of both the first and second shift register and the decision circuit and produces an output signal therefrom only when simultaneously the first stage of both the shift registers indicates a mismatch and both the first and second signal from the decision circuit are in a binary "1" condition during halt time. This output signal is coupled to an inhibit arrangement disposed between a bit rate clock and binary counters to change the counting of the counters to achieve synchronization in less time than required by prior art frame synchronization systems.

10 Claims, 3 Drawing Figures

INVENTOR
JAMES M. CLARK
BY Alfred C. Hill
AGENT

INVENTOR
JAMES M. CLARK
BY *Alfred C. Hill*
AGENT

FRAME SYNCHRONIZATION SYSTEM

BACKGROUND OF THE INVENTION

This invention relates to digital communication systems, such as time division digital demultiplexers including pulse code modulation (PCM) equipment and more particularly to the frame synchronization employed therein.

Before proceeding, it should be noted that as employed herein the term "frame" is defined as one of a series of contingent periods of time during which there are data bits plus one or more synchronization bits with no data bits being present between synchronization bits. In addition, a "multi-frame" is a period of time including one or more "frames," and sufficient to include one entire synchronization code pattern.

In general, the bits of the synchronization codes vary from one frame to another within the multiframe, but are duplicated from one multiframe to the next.

There are three general types of synchronization codes to which the present invention will respond. First, a distributed type synchronization code including one bit per frame and using two or more frames per multiframe. For instance, such a code would include "1" in one frame of the multiframe and a "0" in the other frame of the multiframe. Second, a lumped (character) type synchronization code including more than a few bits (one character) per frame, but one frame is a multiframe. Third, a synchronization code which falls between the first and second type of code. This type of combined synchronization code would have two or more bits per frame, as well as two or more frames per multiframe with the plural synchronization bits being different in each frame of the multiframe.

The general problem is to establish and maintain framing synchronization of a digital communication link in the presence of noise or bit errors. A frame synchronization circuit controls the timing counters of a digital demultiplexer to make the counter timing synchronous with the format of the data received. This circuit has two primary functions (1) to sense when synchronization is lost and (2) to change the phase of the counters, as required, until synchronization is achieved. A reference synchronization pattern generated from the counters is compared with the incoming signal whether or not the counters are synchronized. If synchronization is lost, the equipment will switch to a search mode. In the search mode, the phase of the counters are changed until it is detected that synchronism is achieved after which the frame synchronization system will change to a sense mode to detect a subsequent loss of synchronization.

With the distributed type synchronization code, the usual procedure is to sample one bit of each frame, advance the phase of the counters by one bit each time a mismatch is sampled, except when an averaging or integrating circuit, which responds to the average rate of mismatches, has an output exceeding a certain threshold. The phase of the counters is usually advanced by deleting one clock pulse at the input to the counters, thus, causing the counters to halt momentarily. The threshold of the decision circuit will be exceeded when the mismatch rate is low, and will remain exceeded when the correct phase is reached. This presents further halting.

When the lumped or combined type synchronization code is used, the input signal is shifted down a shift register, one character long. When the code in the shift register matches the expected synchronization code, the counters are reset to a count corresponding to the normal time of arrival of the synchronization character. If the next synchronization code does not arrive as expected, shifting and comparing is repeated as before.

As may be determined from the foregoing, conventional frame synchronization circuits, particularly for the distributed type synchronization code, do not respond immediately, that is, within one bit time of the digital input because the action centers on the charge and discharge of a capacitor whose associated time constant is longer than one bit time. That is, for the conventional circuit, when an incoming digit bit is compared to the local synchronization reference signal and it does not match, the next digital bit to be examined is the next bit of the next frame.

A first copending application of J. M. Clark, Ser. No. 781,181, filed Dec. 4, 1968, now U.S. Pat. No. 3,597,539 discloses an embodiment of a frame synchronization system operating on a distributed type synchronization code that will reduce the search time by one-half the time employed by the conventional synchronization systems mentioned hereinabove operating on the same type of synchronization code.

A second copending application of J. M. Clark, Ser. No. 780,981, filed Dec. 4, 1968, now U.S. Pat. No. 3,594,502 discloses an embodiment of a frame synchronization system operating on the distributed type synchronization code that will reduce the search time by $1/(2\sqrt{N+1})$ as compared with the conventional frame synchronization systems mentioned hereinabove operating on the same type of synchronization code.

SUMMARY OF THE INVENTION

An object of this invention is to provide a frame synchronization system which will further reduce the time for achieving the desired synchronization with respect to said first and second copending applications. Another object of this invention is to provide a frame synchronization system which reduces the time for achieving the desired synchronization as compared to said second copending application when each of the two shift registers have the same number of stages as the single shift register of said second copending application, but said reduction is not as great when compared to the single shift register of said second copending application having an increased number of shift register stages.

A feature of this invention is to provide a frame synchronization system comprising a source of binary information signal having a given bit rate and containing a synchronization component; first means to produce a plurality of timing signals; second means coupled to the source and the first means to examine successive bits of the information signal to recognize the synchronization component and produce as a result of each examination an output signal and the complements of the output signal; and third means coupled to the second means and the first means responsive to the present state of the output signal and one of N cumulative functions of previous states of the output signal and to the present state of the complement of the output signal and one of the N cumulative functions of previous states of the complement of the output signal, where N is an integer equal to at least one, to provide a control signal for timing adjustment of the timing signals when the output signal indicates that out-of-synchronization condition until synchronization is achieved.

Another feature of this invention is the provision of the frame synchronization system of this invention wherein the first means further produces a local binary synchronization reference signal; and the second means includes digital comparison means coupled to the source of the first means to compare the binary condition of successive bits of the information signal and the binary condition of the reference signal and to produce the output signal, and inverting means coupled to the comparison means responsive to the output signal to produce the complements of the output signal.

BRIEF DESCRIPTION OF THE DRAWING

The above-mentioned and other features and objects of this invention will become more apparent by reference to the following discussion taken in conjunction with the accompanying drawings, in which.

DESCRIPTION OF THE PREFERRED EMBODIMENT

Figure 1:
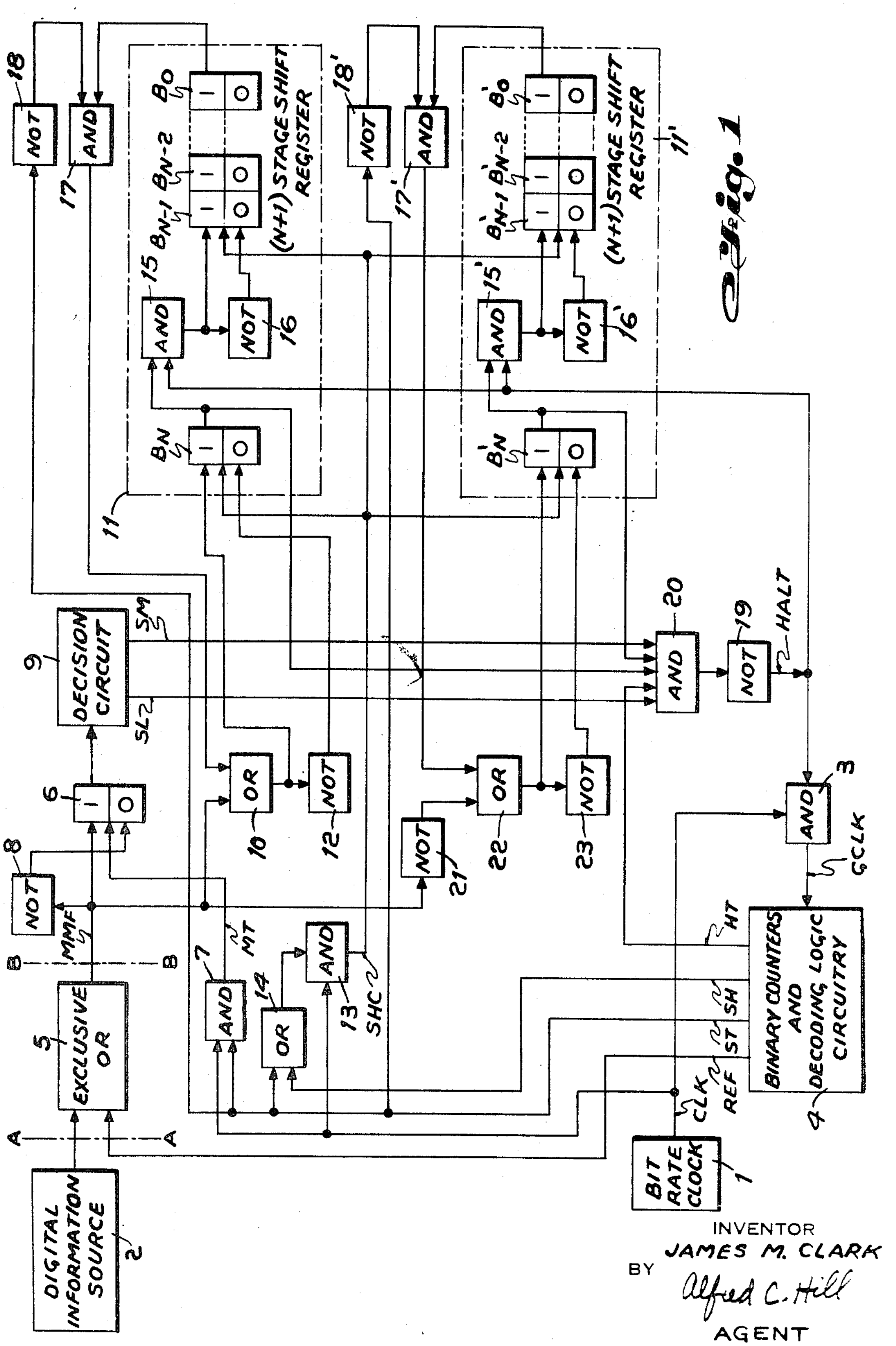
FIG. 1 is a block diagram of the frame synchronization system in accordance with the principles of the present invention for a distributed type synchronization code as defined herein.

As pointed out hereinabove, there are three general types of synchronization codes. The system of this invention will first be completely described employing a synchronization code or signal of the distributed type with the synchronization bit of each frame alternating between "1" and "0." Thus, the synchronization pattern will be 1, 0 in each multiframe.

The present invention describes a method of extracting more synchronization information out of the digital (binary) information input in a given period of time and using the additional information to speed up the synchronization search. The method and circuitry of the present invention is an extension of the method and circuitry disclosed in said second copending application.

When searching for frame synchronization, that is, when trying to determine which bits are synchronization bits, all the bits are possible synchronization bits and, thus, all have useful information. However, it is common practice to assume that a particular bit is a synchronization bit and transferring this assumption to another bit when the assumed "synchronization bit" does not match the local synchronization reference signal. In doing so, all other bits are ignored. The only excuse for throwing away this information is equipment economy.

However, as pointed out in said second copending application, a shift register affords an economical means of checking several bits out of every frame, because it allows the logic to be done in serial form. This is essentially easy because the binary information is in serial form. If the shift register is (N+1) bits or stages long, the N information bits immediately following the assumed synchronization bit are serially transferred to the shift register once per frame. In accordance with said second copending application, this transfer, however, is accomplished by digitally comparing, such as EXCLUSIVE ORing, the information bits with the local synchronization reference signal and OR-ing the output of the EXCLUSIVE OR with the output of the shift register. It was determined in said second copending application that the employment of the shift register results in a reduction of $1/\sqrt{N+1}$ with respect to the time required by the frame synchronization system disclosed in said first copending application.

In accordance with the present invention, there is added to the arrangement of said second copending application a second shift register having (N+1) bits or stages long with the output of the digital comparator being inverted to provide a complement of the digital comparator output which is OR-ed with the output of the second shift register. With this arrangement there is an increase in the number of digits per frame that are checked and it has been determined that where the second shift register has the same number of stages as the first shift register there is an increase of 30 per cent in the reduction of the acquisition time, the time of acquiring synchronization. However, this arrangement does not provide the optimum reduction in acquisition time, since it has been determined that if the single shift register of said second copending application were increased from three stages to seven stages, there results a 41 per cent decrease in the acquisition time.

Although, as pointed out hereinabove, the arrangement of the present invention, does not achieve optimum reduction of acquisition time, there is, however, a reduction in the acquisition time relative to the prior art synchronization arrangement as well as the synchronization arrangements described in said first copending application and said second copending application when the second shift register of this invention has a number of stages equal to the number of stages of the shift register of said second copending application.

Referring to FIG. 1, there is illustrated therein a block diagram of one embodiment of the frame synchronization system of this invention capable of operating with a distributed type synchronization code. Clock 1 produces clock pulses at the bit rate of the input digital information signal from source 2 and is applied to AND gate 3 and, hence, to binary counters and decoding logic circuitry 4 to produce various timing signals necessary in the operation of the frame synchronization system, as well as the timing signals necessary for other functions, such as to demultiplex the multiplex signal received from source 2. For purposes of explanation, it will be assumed that the frame rate of the information signal is 8 KC, that the received one bit distributed synchronization code has the pattern in adjacent frames of 1, 0 and that the local synchronization reference signal REF is a 4 KC square wave. Other timing signals necessary in the operation of the frame synchronization system are generated by circuitry 4, namely, the synchronization bit time signal ST having a constant width of one clock period, the halt time signal HT having a variable width equal to the width of the HALT pulse plus the width of one clock period, and the shift register timing signal SH having a varying width equal to the width of N clock periods plus the width of the HALT pulse.

The halt time signal HT is employed to prevent the frame synchronization system from locking in an unsynchronized and unstationary condition upon power turn-on, since components 6, 9, and $B_N$ and $B'_N$ could otherwise assume a combination of states that would stop the counters of circuitry 4. The lack of timing signals would prevent flip flop 6 and flip flops $B_N$ and $B'_N$ of shift registers 11 and 11' from leaving the above combination of states. By utilizing halt time signal HT, the counters of circuitry 4 are allowed to stop only when the timing signals are available to flip flop 6 and flip flops $B_N$ and $B'_N$ of shift registers 11 and 11'.

The information signal from source 2 and the local synchronization reference signal REF from circuitry 4 are applied to EXCLUSIVE OR gate 5 which compares the binary conditions of the successive bits of the information signal and the REF signal. Gate 5 will then produce an output signal which indicates match and mismatch between the binary conditions of the two input signals applied thereto and is identified as MMF signal. The MMF signal is applied directly to flip flop 6 which will be triggered by the MT signal produced at the output of AND gate 7 which has its inputs coupled to clock 1 and the ST signal output from circuitry 4. The signal coupled from gate 5 to flip flop 6 will be sampled by flip flop 6 on the leading edge of the MT signal and the state of flip flop 6 will be changed on the trailing edge of the MT signal for the type of flip flop assumed for illustration. Thus, if the MMF signal is a binary "1," representative of a mismatch, the output from flip flop 6 will be a "1" in time coincidence with the trailing edge of the MT signal. The output from gate 5 is also coupled to a NOT or inverter circuit 8. Thus, when the MMF signal is "0," the output of NOT 8 will be a "1" which will be sampled at the leading edge of the MT signal and at its trailing edge will cause flip flop 6 to change its state, thus, producing at the "1" output of flip flop 6 a binary "0" condition.

The output from flip flop 6 is coupled to decision circuit 9 which determines whether the samples presented hereto indicate a synchronized condition. Decision circuit 9 may be of the type disclosed in the copending applications of J. M. Clark (cases 4 and 5), Ser. No. 66,258, filed Aug. 24, 1970 and Ser. No. 36,744, filed May 13, 1970.

The output from gate 5 is also coupled to OR gate 10. The output of OR 10 is coupled to the "1" input of flip flop $B_N$ of shift register 11 and through NOT 12 to the "0" input of the same flip flop. The triggering pulses SHC for flip flop $B_N$ and the other stages of register 11 is produced by AND 13 which has one input coupled to the output of clock 1 and the other input coupled to the output of OR 14 whose two inputs are coupled to the ST and SH outputs of circuitry 4.

The output from flip flop $B_N$ is coupled to AND 15 whose output is coupled to the next succeeding stage of shift register 11 directly and through NOT 16 as illustrated. In the remainder of register 11, the "1" and "0" outputs of one stage are coupled to the "1" and "0" inputs, respectively, of the succeeding stage. The output of register 11 is coupled to AND 17 with the other input thereof being provided by NOT 18 which is coupled to the ST output of circuitry 4. Thus, AND 17 will be enabled only when the ST signal is in the "0" binary condition and is disabled when it is in the "1" condition. This permits information related to all but the first of the (N+1) previous samples of the MMF signal to be shifted through AND 17 and to the other input of OR 10 to provide a cumulative OR-function of the MMF signal of each frame phase, which in turn, is stored in register 11. The shifting of information from stage $B_N$ to stage $B_O$ and back to stage $B_N$ is triggered by signal SHC, which includes N+1+H consecutive clock pulses per frame, where H is the number of clock pulses inhibited by the HALT signal. However, the information is modified during this round trip by gates 17, 10 and 15 as described herein.

AND 15 is coupled to the output of NOT 19 whose input is coupled to the output of AND 20. Thus, in the absence of an output signal from AND 20, AND 15 will permit the shifting of information from stage $B_N$ to stage $B_{N-1}$ of shift register 11 and normal counting continues in the counters of circuitry 4. In this case, signal SHC has (N+1) clock pulse per frame, occurring during counts O through N of the counters of circuitry 4. Since this is also the number of stages of shift register 11, each bit of information in shift register 11 will be shifted in exactly one round trip and will return to its original position each frame period. The information bit originating from and returning to stage $B_S$ is OR-gated by OR 10 with signal MMF when the counters of circuitry 4 are at a count S, where S is any integer from 1 to N. The bit originating from $B_O$, however, is inhibited by AND 17 because signal ST is in the "1" condition when the counters of circuitry 4 are at count 0. After a number of frames, each stage $B_S$ stores an accumulated OR-condition of mismatches sampled at count S of each frame.

When an output signal occurs from AND 20, AND 15 is disabled due to NOT 19 and the information from stage $B_N$ is replaced by a zero condition shifted into stage $B_{N-1}$ so that when the zero condition is later shifted out of stage $B_O$, it can be OR-gated with new information at OR 10. Also in this case, the H additional clock pulses per frame of signal SHC causes the information in shift register 11 to be shifted H positions more than a complete round trip. The timing is such that the bits originating from the H right-most stages of shift register 11 are OR-gated (except for the first bit) with H successive bits of signal MMF at OR 10; the resultant H bits are replaced by zeros at AND 15; then these H zeros are OR-gated at OR 10 with H bits of signal MMF at H phases (bit positions within the frame period of the input information) not previously sampled. When the shifting stops, the resultant H bits reside in the H left-most stages of shift register 11.

A second (N+1) stage shift register 11' is provided as illustrated wherein the first stage $B'_N$ is interconnected with the second stage $B'_{N-1}$ by AND 15' and NOT 16' having a purpose as described hereinabove for register 11. The output of gate 5 is inverted in NOT 21 to provide a complement of the MMF signal which is OR-gated in OR gate 22 with the output of AND 17' coupled to the last stage of register 11' and to the output of NOT 18' whose input is coupled to the ST output of circuitry 4 and has the function as described hereinabove with respect to the first shift register 11. OR 22 and NOT 23 in its association with the first stage $B'_N$ of register 11' has the same function as OR 10 and NOT 12 associated with register 11.

The operation of register 11' and its associated circuitry is identical to that described hereinabove for register 11 and its associated circuitry. However, due to the presence of the second shift register 11' and its associated circuitry more information is derived as to the presence of the synchronization code and, therefore, decreases the acquisition time as indicated hereinabove with respect to the arrangement of said second copending application including only a single shift register having a number of stages equal to the stages of registers 11 and 11', such as register 11 and its associated circuitry.

AND 20 has five inputs, signal SL from decision circuit 9 indicating whether the threshold has been reached and exceeded, or not, signal SM from decision circuit 9 indicating whether the system is in a search mode or a sense mode, the output from flip flop $B_N$, the output from flip flop $B'_N$ and the HT signal from circuitry 4. The output signal SL of decision circuit 9 is in a "1" condition when the voltage therein is below the decision level voltage and is in a "1" condition when the voltage therein is above the decision level. The SM output of circuit 9 is in the "1" condition when the system is in a search mode and in a "0" condition when the system is in a sense mode. It should also be noted that when the OR-function from OR gates 10 and 22 indicates a mismatch (binary "1"), there will be a "1" at the output of flip flop $B_N$ and $B'_N$. Thus, when any of the input signals to AND 20 are in the "0" binary condition there is no output from AND 20 resulting in a "1" output from NOT 19 which enables gate 3 and, thus, there is no halting of the application of the clock CLK from clock 1 to circuitry 4, and the counters of circuitry 4 will count normally without interruption. However, when all the inputs to AND 20 are in binary condition "1," a binary "1" output will be produced and inverted by NOT 19 to produce a "0" output which is the HALT pulse coupled to AND gate 3. The HALT pulse will inhibit clock pulses from clock 1 and stop the counting action of the counters in circuitry 4 and the resultant shift in the phase or timing of the timing signals produced by circuitry 4. The amount of phase shift is dependent upon how many clock pulses are inhibited as was clearly explained and a detailed description thereof presented in accordance with the graphical illustrations in FIGS. 4–10 of said second copending application.

Figure 2:
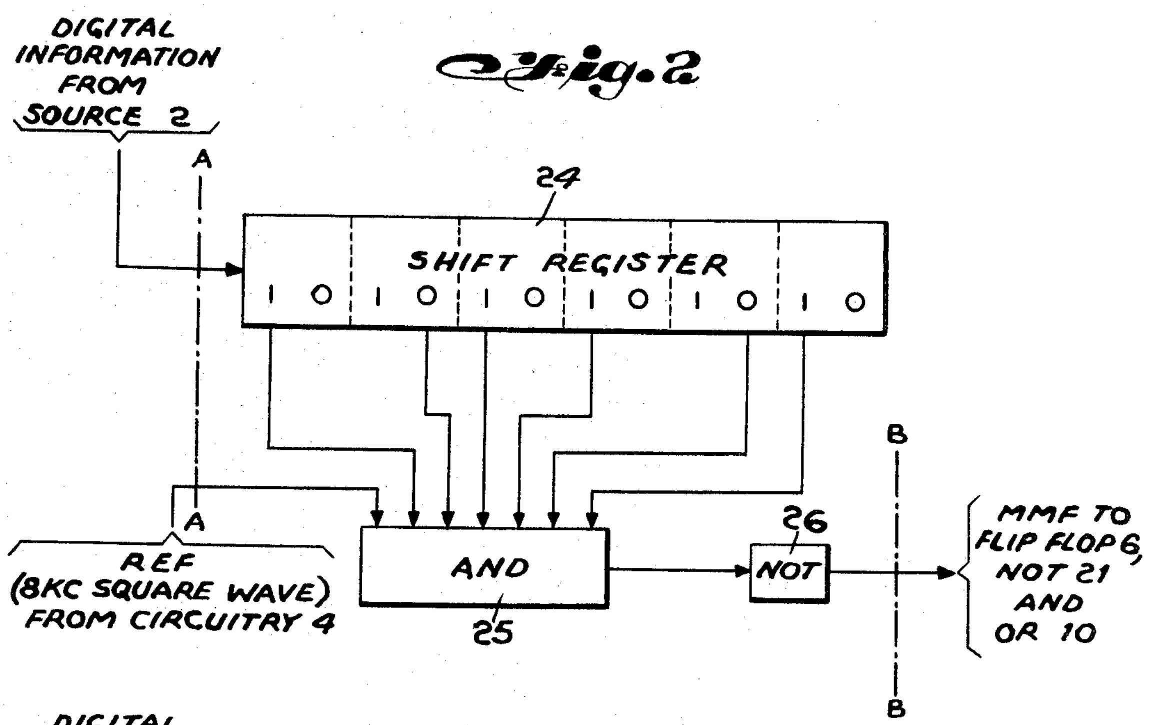
FIG. 2 is a block diagram of one embodiment of an arrangement that may be substituted for the arrangement between lines A—A and B—B of FIG. 1 to achieve synchronization according to the present invention for a lumped type of synchronization code as defined herein.

Referring to FIG. 2, there is illustrated a digital comparison means that may be substituted for EXCLUSIVE OR 5 of FIG. 1 between lines A—A and B—B to render the synchronization system of this invention applicable to the lumped type synchronization code. Assume, for purposes of explanation, that the lumped synchronization code pattern is 101101. Successive bits of the information signal are shifted into the six stage shift register 24, each stage including, for instance, a flip flop. Appropriate "1" or "0" output of each flip flop of register 24 as coupled to AND 25, as illustrated to recognize the assumed lumped code pattern. REF signal would be an 8 KC square wave properly phased to have a "1" state at the time when the synchronization code should be present. When a "1" appears on all inputs to AND 25, a match is present and a "1" appears at the output of AND 25. When a "0" appears on any one of the inputs to AND 25, a mismatch is present and a "0" appears at the output of AND 25. However, these outputs from AND 25 were opposite to the requirements of the MMF function from gate 5 wherein a match is represented by "0" and a mismatch is represented by a "1". To overcome this inversion, the output signal of AND 25 is coupled to NOT 26 to provide an MMF signal at the output of the digital comparison means of FIG. 2 having identical representation as the MMF output signal of gate 5, FIG. 1. Therefore, the remainder of the circuitry of FIG. 1 will operate as previously described.

Employment of the system of FIG. 1 with the digital comparison means of FIG. 2 for a lumped synchronization code will result in a reduction of the search time relative to the search time of the prior art and said first and second copending applications, but it does not appear that the reduction of search time will be as great as that achieved by the system of FIG. 1 for a distributed synchronization code.

Figure 3:
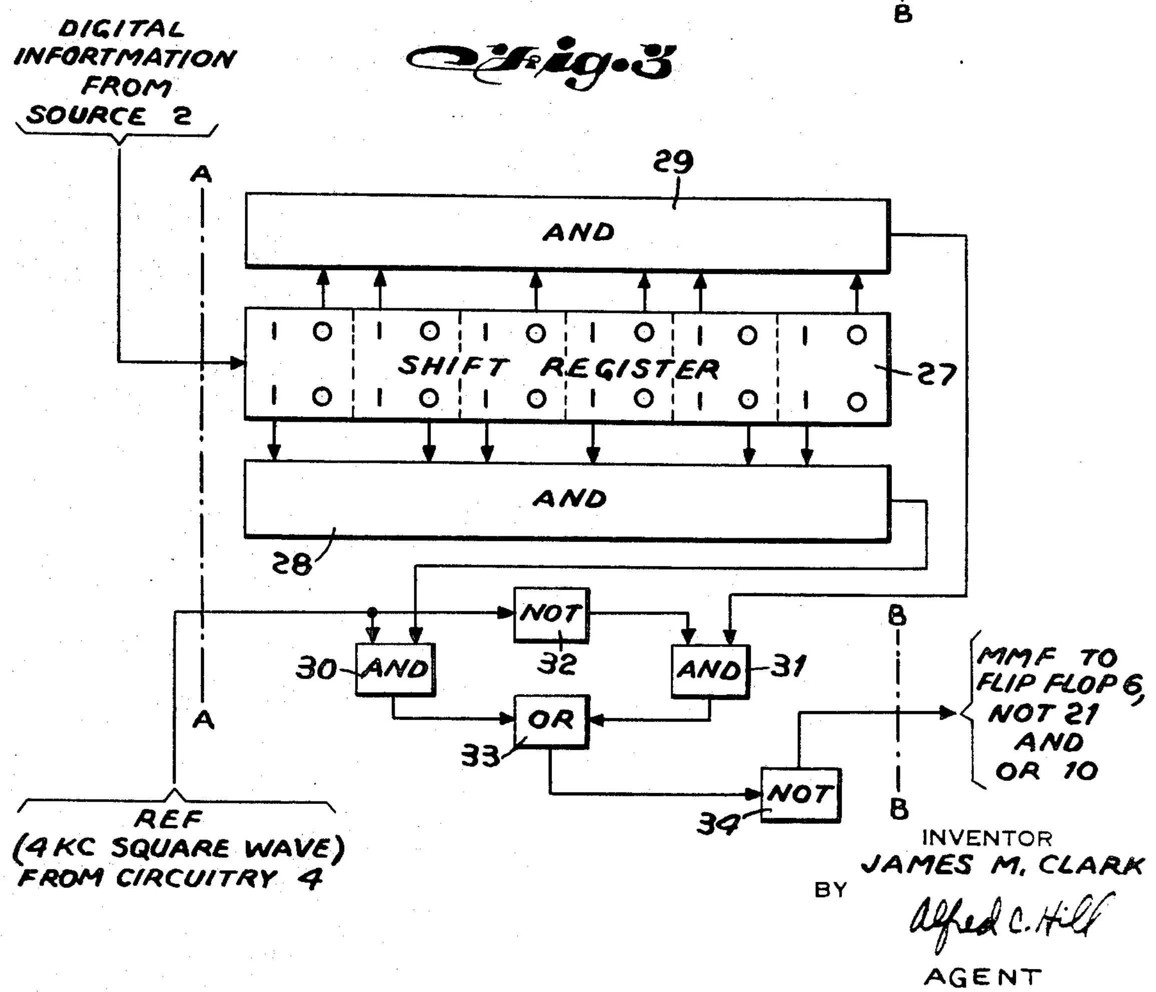
FIG. 3 is a block diagram of one embodiment of an arrangement that may be substituted for the arrangement between lines A—A and B—B of FIG. 1 to achieve synchronization according to the present invention for a combined lumped and distributed type of synchronization code as defined herein.

Referring to FIG. 3, there is illustrated a digital comparison means that can be substituted for EXCLUSIVE OR 5 of FIG. 1 between lines A—A and B—B to render the synchronization system of this invention applicable to the combined lumped and distributed synchronization code. It will be assumed, for purposes of explanation, that this combined synchronization code pattern is 101101 in one frame of a two frame multiframe, and 010010 in the other frame of the two frame multiframe. Successive bits of the information signal of source 2 are shifted into a six stage shift register 27, each stage, including, for instance, a flip flop. The appropriate "1" or "0" output of each flip flop of register 27 is coupled to AND 28, as illustrated, to recognize the assumed code pattern 101101 and the appropriate "1" or "0" output of each flip flop of register 27 is coupled to AND 29, as illustrated, to recognize the assumed code pattern 010010. A "1" output from AND 28 indicates that the code 101101 has been recognized while a "1" output from AND 29 indicates that the code 010010 has been recognized. One input of AND 30 is coupled to the output of AND 28 and the other input of AND 30 receives the REF signal directly from circuitry 4 which is this embodiment, for the example employed herein, would be a 4 KC square wave properly phased to have a "1" state at the time when the synchronization code 101101 should be present in one frame of the two frame multiframe. One input of AND gate 31 is coupled to the output of AND 29 and the other input of AND 31 receives the REF signal from circuitry 4 through NOT 32 to provide the REF signal with a "1" state at the time when the synchronization codes 010010 should be present in the other frame of the two frame multiframe. The outputs of AND's 30 and 31 are coupled to OR 33. When signal REF is "0," the output of NOT 32 will be "1," allowing the condition from AND 29 to appear at the output of AND 31, and the output of AND 30 will be "0," allowing the condition from AND 31 to appear at the output of OR 33, which will be the condition of AND 29. However, when the signal REF is "1," the condition of AND 28 will appear at the output of AND 30, and the output of NOT 32 will be "0" making the output of AND 31 "0," which will allow the condition of AND 30 to appear at the output of OR 33, which will be in a condition of AND 28. Thus, the condition of signal REF selects whether the condition of AND 29 (or else of AND 28) will appear at the output of OR 33. Since the outputs of AND 28 and AND 29 indicate a match (if "1") and a mismatch (if "0") of the input information and the associated codes, the output of OR 33 will indicate in the same manner a match or a mismatch of the input information with the code selected by the condition of the signal REF. It should be noted that the output signal from OR 33 is opposite to the requirements of the MMF function from gate 5, FIG. 1, wherein a match is represented by "0" and a mismatch is represented by a "1." To overcome this inversion, the output signal of OR 33 is coupled to NOT 34 to provide an MMF signal at the output of the digital comparison means of FIG. 3 having identical representation as the MMF output signal of gate 5, FIG. 1. Therefore, the reamինder of the circuit of FIG. 1 will operate as previously described.

Employment of the system of FIG. 1 with the digital comparison means of FIG. 3 for a combined lumped and distributed synchronization code will result in reduction of search time relative to the search time of related prior art and said first and second copending applications which appears to be of the same magnitude, at least for some cases, as that achieved by the system of FIG. 1 for a distributed synchronization code.

While I have described above the principles of my invention in connection with specific apparatus, it is to be clearly understood that this description is made only by way of example.

I claim:

1. A frame synchronization system comprising:

a source of binary information signal having a given bit rate and containing a synchronization component;

first means to produce a plurality of timing signals;

second means coupled to said source and said first means to examine successive bits of said information signal to recognize said synchronization component and produce as a result of each examination an output signal and the complement of said output signal; and third means coupled to said second means and said first means responsive to the present state of said output signal and one of N cumulative OR-functions of previous states of said output signal and to the present state of said complement of said output signal and one of N cumulative OR-functions of previous states of said complement of said output signal, where N is an integer equal to at least one, to provide a control signal for timing adjustment of said timing signals when said output signal indicates an out-of-synchronization condition until synchronization is achieved.

2. A system according to claim 1, wherein said first means further produces a local binary synchronization reference signal; and said second means includes digital comparison means coupled to said source and said first means to compare the binary condition of successive bits of said information signal and the binary condition of said reference signal and to produce said output signal, and inverting means coupled to said comparison means responsive to said output signal to produce said complement of said output signal.

3. A system according to claim 2, wherein said digital comparison means includes an EXCLUSIVE OR.

4. A system according to claim 2, wherein said first means includes a source of clock signals having said given rate, binary counter means, decoding means coupled to said counter means to produce said timing signals and said reference signal, and inhibit means coupled between said source of clock signals and said counter means and to said third means responsive to said control signal to carry out said timing adjustment.

5. A system according to claim 2, wherein said third means includes fourth means having a decision level coupled to said comparison means to produce a first signal having a binary "1" condition when the voltage therein resulting from said output signal is less than said decision level and a binary "0" condition when the voltage therein resulting from said output signal is greater than said decision level and a second signal having a binary "1" condition when said system is in a search mode and a binary "0" condition when said system is in a sense mode.

6. A system according to claim 5, wherein said third means further includes a first (N+1) stage shift register to store said N cumulative OR-functions of previous states of said output signal, and a second (N+1) stage shift register to store said N cumulative OR-functions of previous states of said complement of said output signals.

7. A system according to claim 6, wherein said third means further includes a first OR having two inputs, one input being coupled to said digital comparison means and the other input being coupled to the output of said first shift register, a second OR having two inputs, one input being coupled to said inverting means and the other input being coupled to the output of said second shift register, and fifth means coupled to said fourth means, the output of the first stage of said first shift register and the output of the first stage of said second shift register to produce said control signal when simultaneously said first and second signals are in their binary "1" condition and there is a binary "1" from both the first stage of said first shift register and the first stage of said second shift register.

8. A system according to claim 7, wherein said fifth means includes an AND.

9. A system according to claim 8, further including a bistable means coupled between said digital comparison means and said fourth means.

10. A system according to claim 2, wherein said first means includes a source of clock signals having said given rate, binary counter means, decoding means coupled to said counter means to produce said timing signals and said reference signal, and inhibit means coupled between said source of clock signals and said counter means;

said digital comparison means includes an EXCLUSIVE OR; and said third means includes fourth means having a decision level coupled to said EXCLUSIVE OR to produce a first signal having a binary "1" condition when the voltage therein resulting from said output signal is less than said decision level and a binary "0" condition when the voltage therein resulting from said output signal is greater than said decision level and a second signal having a binary "1" condition when said system is in a search mode and a binary "0" condition when said system is in a sense mode, a first (N+1) stage shift register to store said N cumulative OR-functions of previous states of said output signals, a second (N+1) stage shift register to store said N cumulative OR-functions of previous states of said complement of said output signal, a first OR having two inputs, one input being coupled to said EXCLUSIVE OR and the other input being coupled to the output of said first shift register, a second OR having two inputs, one input being coupled to said inverting means and the other input being coupled to the output of said second shift register, and an AND coupled to said fourth means, the output of the first stage of said first shift register and the output of the first stage of said second shift register to cooperate in producing said control signal for coupling to said inhibit means to carry out said timing adjustment, said control signal being produced when simultaneously said first and second signals are in their binary "1" condition and there is a binary "1" from both the first stage of said first shift register and the first stage of said second shift register.

* * * * *